(12) United States Patent
Bartels et al.

(10) Patent No.: US 11,511,739 B2
(45) Date of Patent: Nov. 29, 2022

(54) ASSISTANCE WITH ENDING SHOULDER DRIVING BY A MOTOR VEHICLE

(71) Applicant: Volkswagen Aktiengesellschaft, Wolfsburg (DE)

(72) Inventors: Arne Bartels, Wolfsburg (DE); Thomas Kolms, Wasbüttel (DE); Timo Klingemann, Sassenburg (DE); Amogh Sakpal, Brühl (DE); Robin Braeutigam, Frechen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 277 days.

(21) Appl. No.: 16/871,623

(22) Filed: May 11, 2020

(65) Prior Publication Data
US 2020/0361458 A1    Nov. 19, 2020

(30) Foreign Application Priority Data
May 13, 2019   (DE) .................... 10 2019 206 882.0

(51) Int. Cl.
*B60W 30/10*    (2006.01)
*B60W 50/14*    (2020.01)
(Continued)

(52) U.S. Cl.
CPC ............ *B60W 30/10* (2013.01); *B60W 10/18* (2013.01); *B60W 10/20* (2013.01); *B60W 40/08* (2013.01); *B60W 50/14* (2013.01)

(58) Field of Classification Search
CPC ...... B60W 30/10; B60W 10/18; B60W 10/20; B60W 40/08; B60W 50/14; B60W 30/12;
(Continued)

(56) References Cited

U.S. PATENT DOCUMENTS

| 9,340,187 B2 | 5/2016 | Hecker et al. |
| 2006/0224293 A1 | 10/2006 | Kawazoe et al. ............... 701/70 |

(Continued)

FOREIGN PATENT DOCUMENTS

| DE | 19751227 A1 | 9/1998 | ............ B60T 8/1764 |
| DE | 10244204 A1 | 4/2004 | ............ B60T 8/1764 |

(Continued)

OTHER PUBLICATIONS

J. Black et al., "Vehicle road runoff—active steering control for shoulder induced accidents," 2008, Publisher: IEEE.*

(Continued)

*Primary Examiner* — Tuan C To
(74) *Attorney, Agent, or Firm* — Slayden Grubert Beard PLLC

(57) ABSTRACT

In a method for ending shoulder driving, it is detected by means of a detection unit of a motor vehicle that a wheel is located on a shoulder. By means of a sensor unit, a driver's reaction is recorded, and by means of a computing unit, the driver's reaction is assigned to one of at least two intensity classes. By means of a control unit, an intervention in controlling the vehicle is undertaken counteracting the driver's reaction when the driver's reaction has been assigned to a first intensity class, and an intervention supporting the driver's reaction is undertaken when the driver's reaction has been assigned to a second intensity class.

20 Claims, 2 Drawing Sheets

(51) Int. Cl.
B60W 10/18 (2012.01)
B60W 40/08 (2012.01)
B60W 10/20 (2006.01)

(58) Field of Classification Search
CPC ............ B60W 30/02; B60W 2540/18; B60W 2540/12; B60W 2552/53; B60W 2710/182; B60T 8/17557; B60T 8/1764; B60T 2220/00
USPC .......................................................... 701/41
See application file for complete search history.

(56) References Cited

U.S. PATENT DOCUMENTS

| | | | | |
|---|---|---|---|---|
| 2007/0001510 A1* | 1/2007 | Miller | .................. | B60T 8/1764 303/149 |
| 2008/0281521 A1* | 11/2008 | Shirato | ................. | B60W 30/09 701/301 |
| 2012/0239255 A1 | 9/2012 | Kojima et al. | ................... | 701/42 |
| 2013/0018549 A1* | 1/2013 | Kobana | .................. | B60K 28/06 701/41 |
| 2014/0114536 A1* | 4/2014 | Kobana | .................. | B60K 28/06 701/1 |
| 2015/0042151 A1* | 2/2015 | Zimmermann | ........... | B60T 7/22 303/3 |
| 2015/0046015 A1* | 2/2015 | Ulbricht | ................. | G08G 1/167 701/1 |
| 2015/0151750 A1* | 6/2015 | Tsuchiya | ................ | B62D 7/159 701/41 |
| 2015/0203126 A1* | 7/2015 | Kobana | ................. | B60W 50/12 701/1 |
| 2015/0251656 A1* | 9/2015 | Yester | ................... | B60W 30/09 701/41 |
| 2015/0348418 A1* | 12/2015 | Pfeiffer | ................. | B60W 50/14 340/435 |
| 2018/0037260 A1* | 2/2018 | Otake | .................. | G05D 1/0212 |
| 2020/0017124 A1* | 1/2020 | Camhi | .................. | B60W 10/08 |
| 2021/0213945 A1* | 7/2021 | Schamburek | ............ | G06N 5/04 |

FOREIGN PATENT DOCUMENTS

| | | | | |
|---|---|---|---|---|
| DE | 10357254 A1 | 6/2005 | ............. | B60T 17/18 |
| DE | 102004045483 A1 | 4/2006 | ............... | A61B 5/18 |
| DE | 102005003177 A1 | 7/2006 | ............... | G05D 1/02 |
| DE | 102005049368 A1 | 4/2007 | ............... | B62D 6/04 |
| DE | 102007033066 A1 | 1/2008 | ............... | B62D 5/04 |
| DE | 102008005305 A1 | 7/2009 | ............ | B60W 30/08 |
| DE | 102010012497 A1 | 9/2011 | ............ | B60T 8/1761 |
| DE | 102011082567 A1 | 3/2013 | ............... | B62D 5/04 |
| DE | 102016204512 A1 | 9/2016 | ............ | B60W 10/18 |
| DE | 102015217783 A1 | 3/2017 | ............ | B60W 30/08 |
| EP | 1350707 A2 | 10/2003 | ............. | B60R 21/00 |
| EP | 1995136 A1 | 11/2008 | ............ | B60T 8/1755 |
| EP | 3223260 A1 * | 9/2017 | ............ | B60W 10/18 |
| GB | 2373117 A * | 9/2002 | ............ | B60N 2/2863 |
| WO | WO-0054008 A1 * | 9/2000 | ............ | B60N 2/2863 |

OTHER PUBLICATIONS

Hiroaki et al., "Preliminary study on vehicle-to-roadside system using RFIDs for detecting road shoulders," 2009, Publisher: IEEE.*
Andrew et al., "Integrated threat assessment and control design for roadway departure avoidance," 2012, Publisher: IEEE.*
German Office Action, Application No. 102019206882.0, 7 pages, dated Oct. 8, 2019.

* cited by examiner

ASSISTANCE WITH ENDING SHOULDER DRIVING BY A MOTOR VEHICLE

CROSS-REFERENCE TO RELATED APPLICATIONS

This application claims priority to German Patent Application No. DE 10 2019 206 882.0, filed on May 13, 2019 with the German Patent and Trademark Office. The contents of the aforesaid patent application are incorporated herein for all purposes.

TECHNICAL FIELD

The present invention relates to a method for ending shoulder driving by a motor vehicle, a corresponding system, and a computer program.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

When a motor vehicle drives on a shoulder, i.e., a situation in which at least one wheel of the motor vehicle is located on a shoulder next to the roadway, and at least one opposing wheel is on the roadway, it is a so-called p-split situation. In this case, the p stands for the friction value between the respective wheels and the corresponding ground. For example, the left wheels of the motor vehicle are on the roadway with a high friction value such as concrete or asphalt, whereas the right wheels of the motor vehicle are on the shoulder with a low friction value such as grass, gravel or sand. If the driver of the motor vehicle recognizes this situation and attempts to steer the vehicle back onto the roadway, it can transpire that the driver performs excessive steering, braking or acceleration maneuvers and, as a consequence, loses control of the motor vehicle or ends up further in the direction towards the opposite side of the roadway than intended. This can cause serious accidents.

Known driver assistance systems such as ESC systems cannot prevent skidding or oversteering the vehicle in every situation, in particular when the driver manifests a particularly strong reaction. Optical driver assist systems that are based on cameras, etc. cannot recognize lane marking lines or roadway edges under every condition, and they therefore also cannot reliably prevent accidents arising from shoulder driving.

In the document EP 1 350 707 A2, a device is described for lateral guiding assistance in motor vehicles. In doing so, an actual position of a vehicle relative to the borders of the traveled lane is compared with a target value. Based on the comparison, a command is output to generate a steering torque that assists the driver in his steering actions. According to the device, it should be prevented in particular that the active intervention by the driver in controlling the vehicle is inhibited or made more difficult by an opposite effect of the lateral guidance system, or leads to an excessive opposite reaction or overreaction. The lateral guidance system therefore adapts to a strong maneuver by the driver.

SUMMARY

An object of the present invention is to provide an improved approach for ending shoulder driving by a motor vehicle by means of which shoulder driving can be ended more reliably, faster and more safely.

The object is achieved by a method, a system, and a computer readable medium according to the independent claims. Embodiments are the subject matter of the dependent claims and the following description.

The improved approach is based on the idea of classifying a reaction by the driver to shoulder driving according to its intensity and, depending on the intensity class to which the driver's reaction can be assigned, engaging in an intervention in controlling the vehicle that counteracts or supports the driver's reaction.

In one exemplary aspect, a method for ending shoulder driving by a motor vehicle is provided, which method comprises:
- recognizing, using a detection unit of the motor vehicle, that a wheel of the motor vehicle is located on a shoulder;
- recording, using a sensor unit of the motor vehicle, a driver's reaction;
- assigning, using a computing unit of the motor vehicle, the driver's reaction to one of at least two intensity classes;
- conducting, using a control unit of the motor vehicle, an intervention in controlling the vehicle that counteracts the driver's reaction when the driver's reaction has been assigned to a first intensity class of the at least two intensity classes; and
- conducting, using the control unit, an intervention in controlling the vehicle that supports the driver's reaction if the driver's reaction has been assigned to a second intensity class of the at least two intensity classes.

In another exemplary aspect, a system for ending shoulder driving by a motor vehicle is provided. The system comprises:
- a detection unit configured to recognize that a wheel of the motor vehicle is located on a shoulder;
- a sensor unit configured to record a driver's reaction;
- a computing unit configured to assign the driver's reaction to one of at least two intensity classes; and
- a control unit configured
- to initiate an intervention in controlling the vehicle that counteracts the driver's reaction when the driver's reaction has been assigned to a first intensity class of the at least two intensity classes; and
- to initiate an intervention in controlling the vehicle that supports the driver's reaction if the driver's reaction has been assigned to a second intensity class of the at least two intensity classes.

The details of one or more embodiments are set forth in the accompanying drawings and the description below. Other features will be apparent from the description, drawings, and from the claims.

DETAILED DESCRIPTION

Figure 1:
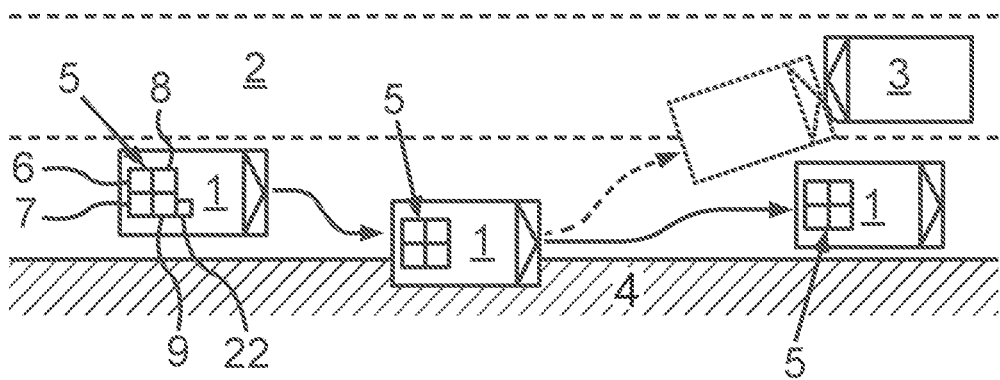
FIG. 1 shows a schematic representation of a motor vehicle with an exemplary embodiment of a system according to the improved approach.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

According to a first exemplary independent aspect, a method is provided for ending shoulder driving by a motor vehicle. By means of a detection unit of the motor vehicle, it is recognized that a wheel of the motor vehicle is located on a shoulder. By means of a sensor unit of the motor vehicle, a driver's reaction, e.g., a driver's reaction to the existence of shoulder driving, is recorded, and the driver's reaction is assigned to one of at least two intensity classes by means of a computing unit of the motor vehicle. By means of a control unit of the motor vehicle, an intervention in controlling the vehicle is undertaken that counteracts the driver's reaction, e.g., an automatic or fully automatic intervention when the driver's reaction has been assigned to a first intensity class of the at least two intensity classes. By means of the control unit, an intervention in controlling the vehicle is undertaken that supports the driver's reaction, e.g., automatically or fully automatically when the driver's reaction has been assigned to a second intensity class of the at least two intensity classes.

The method for ending shoulder driving can for example be understood as a method for supporting a driver in the ending of shoulder driving.

The intervention in controlling the vehicle may, e.g., include an intervention in steering, such as automatically performing a steering maneuver by means of the control unit, and/or an intervention in the brake system of the motor vehicle; it can therefore for example include automatically or fully automatically performed braking, such as an intervention in braking a single wheel.

Shoulder driving by a motor vehicle may in this case and in the following be understood as at least one wheel of the motor vehicle being on or in a shoulder while driving the motor vehicle, whereas at least one additional wheel of the motor vehicle, e.g., an additional wheel on an opposite side of the motor vehicle relative to the wheel, is not on the shoulder but rather in particular on a roadway. In particular with a motor vehicle having four wheels while shoulder driving, for example a right or left wheel is on the shoulder, whereas all other wheels are on the roadway, or both right wheels or both left wheels are on the shoulder, whereas the other two wheels are on the roadway.

In this case and in the following, a roadway can be understood to be a paved region that is provided for regular motor vehicle traffic, i.e., in particular a paved road such as an asphalt road, a concrete road or a cobblestone road.

In this case and in the following, a shoulder may be understood to be an unpaved region next to the roadway, such as laterally next to the roadway. The shoulder may for example be a grass surface, a gravel surface, a gravel lawn or another unpaved surface. A surface quality of the shoulder may differ from the surface quality of the roadway.

In some embodiments, respective friction values of a wheel of the motor vehicle on the roadway, or respectively on the shoulder, differ. The friction value on the roadway is in some embodiments greater than the friction value on the shoulder. With shoulder driving, a so-called p-split situation correspondingly exists.

The detection unit may for example comprise a camera system and/or a system for detecting a wheel movement of the motor vehicle. The detection unit may also contain a system for detecting a vehicle state variable such as for example a vehicle acceleration, a yaw rate, a wheel rotational speed, or a sensor system for identifying a quality of the roadway surface. Accordingly, the detection unit, e.g., together with the computing unit, may calculate a characteristic value for a probability that at least one wheel of the motor vehicle is located on the shoulder. For example, a progression over time of the wheel rotational speed, a wheel slip, a transverse acceleration, a longitudinal acceleration and/or a vertical acceleration of the motor vehicle, a yaw rate of the motor vehicle, a compression travel of one or more wheels of the motor vehicle, or an absorber acceleration of one or more absorbers, e.g., wheel absorbers of the motor vehicle can be determined for this.

When the detection unit has an optical system, an optical sensor system, for example a camera system or a lidar system or a radar system, surroundings of the motor vehicle may for example be monitored therewith, and a roadway lane marker, a roadway edge or other infrastructure features in the surroundings of the motor vehicle may be recognized, and based thereupon, the position of the motor vehicle can be determined laterally relative to the roadway or the roadway boundaries. The existence of shoulder driving may also be detected in this way.

The driver's reaction may for example include manual steering, manual braking or manual actuation of a drive element or accelerator pedal for accelerating the motor vehicle or for driving the motor vehicle.

The driver's reaction is in some embodiments assigned to one of the least two intensity classes in that an intensity, or a characteristic value for the intensity, of the driver's reaction is determined, and the assignment to one of the two intensity classes is made based on the intensity or the characteristic value.

The intensity of the driver's reaction may for example depend on a steering intensity of a steering maneuver of the driver, or on a braking intensity of a braking maneuver of the driver, and/or an intensity of an actuation of an accelerator pedal by the driver. The steering intensity may for example depend on a value of the steering angle of the steering maneuver, a steering angle acceleration and/or a steering angle speed during the steering maneuver. The braking intensity may for example depend on a brake pedal path during the braking maneuver, a brake pedal speed during the braking maneuver, and/or a braking pressure during the braking maneuver.

The intervention in controlling the vehicle that counteracts the driver's reaction in some embodiments mat have an effect that counteracts an effect of the driver's reaction. The counteracting intervention therefore, e.g., attenuates the effect of the driver's reaction. For example, the counteracting intervention acts such that the motor vehicle is moved toward the shoulder, or a movement toward the roadway is lessened. Such an intervention counteracting the driver's reaction may be termed a stabilization.

The intervention in controlling the vehicle supporting the driver's reaction may in some embodiments have an effect that is aligned with the effect of the driver's reaction, such as reinforcing the effect of the driver's reaction. In some embodiments, the supportive intervention acts such that the motor vehicle is moved toward the roadway, or a movement of the motor vehicle toward the roadway is increased. Such an intervention may be termed a reinforcement.

Interventions in the controlling of the vehicle undertaken by means of the control unit may in some embodiments include one or more actions, for example one or more steering actions, i.e., interventions in the steering or in the steering system of the motor vehicle, and/or a braking action, i.e., an intervention in the brake system of the motor vehicle.

The steps of recognizing that the wheel is on the shoulder, of recording the driver's reaction, of assigning the driver's reaction to one of the at least two intensity classes, as well as engaging in the counteracting or supportive intervention in the controlling of the vehicle may for example be repeated iteratively until the detection unit recognizes that shoulder driving has ended, e.g., that a wheel of the vehicle is no longer on the shoulder.

According to a method for ending shoulder driving according to some embodiments, automatic corrections or interventions in the controlling of the vehicle are pursued differently depending on the driver's reaction. The fact that this is beneficial ultimately goes back to the existence of the p-split situation. The driver may, for example when he recognizes the existence of shoulder driving, engage in an overreaction by excessively steering and/or braking as the driver's reaction. In such a case that for example corresponds to a driver's reaction of the first intensity class, the counteracting intervention in controlling the vehicle may be provided by means of the control unit in order to lessen the overreaction of the driver. If however the driver reacts appropriately or less intensely than is appropriate, it may be useful in some embodiments to reinforce the driver by the supportive intervention in controlling the vehicle, i.e., to reinforce the driver's reaction according to the second intensity class. Both situations may be covered in a method according some embodiments, and shoulder driving is ended very quickly, safely and reliably in each case.

The danger that arises from an overreaction by the driver, such as overcontrolling the motor vehicle or skidding the motor vehicle, can be reduced when applying the teachings provided herein. Given an appropriate reaction by the driver, shoulder driving can be ended very quickly and reliably.

According to some embodiments, an intensity of the driver's reaction is determined by means of the computing unit, and the driver's reaction is assigned to one of the at least two intensity classes depending on the determined intensity.

According to some embodiments, the driver's reaction is assigned to the first intensity class when the intensity of the driver's reaction lies within a first intensity range, and is assigned to the second intensity class when the driver's reaction lies within a second intensity range, wherein the first intensity range corresponds to greater intensities than the second intensity range.

According to some embodiments, no intervention in controlling the vehicle is provided by means of the control unit if the driver's reaction has been assigned to a third intensity class of the at least two intensity classes.

For example, the driver's reaction can be assigned to the third intensity class if the intensity of the driver's reaction lies within a third intensity range that corresponds to lesser intensities than the second intensity range.

The intensity of the driver's reaction may for example lie within the third intensity range if the driver does not react, in particular does not attempt to steer the motor vehicle off the shoulder.

Since in such a case an automated intervention in controlling the vehicle is not pursued which may be surprising for the driver, safety is increased.

According to some embodiments, a warning signal is output by the control unit if the driver's reaction has been assigned to the third intensity class.

By means of the warning signal, the driver may for example be notified of the presence of shoulder driving so that he can initiate measures to leave the shoulder.

According to some embodiments, if the driver's reaction has been assigned to the first intensity class, a single wheel braking intervention is undertaken by the control unit for the wheel located on the shoulder as the intervention counteracting the driver's reaction.

The yaw behavior relative to the manual steering action of the driver is reduced by the single wheel braking intervention for the wheel that is located on the shoulder. Lateral force potential of the wheel that is located on the shoulder can also be reduced. This can lessen a jump in lateral force that occurs due to the p-split situation if the wheel that is located on the shoulder returns to the roadway. Finally, for example yaw torque or a jump in transverse acceleration when the wheel that is located on the shoulder reaches the roadway are reduced. As a consequence, the motor vehicle remains easier to control, and unstable driving behavior can be avoided.

According to some embodiments, if the driver's reaction has been assigned to the first intensity class, a steering intervention is automatically engaged in by the control unit toward the shoulder as the intervention counteracting the driver's reaction.

Due to the steering intervention toward the shoulder, overcontrolling on the part of the driver is reduced, decreased or avoided.

According to some embodiments, when the driver's reaction has been assigned to the second intensity class, a single wheel braking intervention is automatically performed on another wheel of the motor vehicle by the control unit, wherein the other wheel in order is not located on the shoulder, to engage in the intervention supporting the driver's reaction.

This is for example a steering single wheel braking intervention. This increases the yaw behavior relative to the steering reaction of the driver, and a potential overreaction of the driver is counteracted beforehand.

According to some embodiments, if the driver's reaction has been assigned to the second intensity class, a steering intervention is undertaken by the control unit in the direction away from the shoulder as the intervention supporting the driver's reaction.

This can in particular end shoulder driving faster.

According to some embodiments, at least one intensity characteristic value of the driver's reaction is determined by means of the computing unit. The assignment of the driver's reaction to one of at least two intensity classes is performed by the computing unit depending on the at least one intensity characteristic value.

According to some embodiments, a steering intensity of a steering maneuver of the driver, and/or a braking intensity of a braking maneuver of the driver, and/or an acceleration intensity of an intended acceleration maneuver of the driver is determined by the computing unit in order to determine the intensity characteristic value.

In order to determine the steering intensity, a steering angle speed, and/or a value of the steering angle during a given time interval may for example be determined. In order to determine the braking intensity, for example a braking pressure, a brake pedal path, a brake pedal speed and/or a brake pedal acceleration may be determined, in particular during the given time interval.

In order to determine the acceleration intensity, or respectively the intensity of the intended acceleration, an accelerator path, an accelerator pressure, an accelerator acceleration and/or an accelerator speed may be determined, for example.

According to another exemplary and independent aspect, a system is provided for ending shoulder driving of a motor vehicle, wherein the system includes a detecting unit which is configured to recognize that a wheel of the motor vehicle is located on a shoulder. The system has a sensor unit which is configured to record a driver's reaction, and a computing unit that is configured to assign the driver's reaction to one of at least two intensity classes. The system has a control unit that is configured to engage in an intervention in controlling the vehicle that counteracts the driver's reaction if the driver's reaction has been assigned to a first intensity class of the at least two intensity classes. The control unit is configured to engage in an intervention in controlling the vehicle that supports the driver's reaction if the driver's reaction has been assigned to a second intensity class of the at least two intensity classes.

Other embodiments of the system for ending shoulder driving can be inferred directly from the various embodiments and designs of the method for ending shoulder driving according to the first aspect, and vice versa. In particular a system for ending shoulder driving according to the improved approach is configured or programmed to perform a method to end shoulder driving according to the improved approach, or a system according to the improved approach performs a method according to the improved approach.

Further embodiments of the method according to the first aspect include such which have one or more features as described in connection with the system according to the present aspect.

According to another exemplary and independent aspect, a computer program is provided that has commands which, when the computer program is run by a system for ending shoulder driving according to the improved approach, for example by a computing unit of the system, cause the system to perform a method for ending shoulder driving according to the improved approach.

According to another exemplary and independent aspect, a computer-readable storage medium is presented on which a computer program according to the improved approach is saved.

According to another exemplary and independent aspect, a motor vehicle is provided that includes a system for ending shoulder driving according to the improved approach, and/or a computer-readable storage medium according to the improved approach.

The invention also encompasses combinations of single or multiple features of the described embodiments.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

In the exemplary embodiments, the described components of the embodiments each represent individual features of the invention that should be considered independent of one another and also in a combination other than the one shown. Furthermore, the described embodiments may also be supplemented by other features than those already described.

Elements having the same functions are, in each case, provided with the same reference numerals in the FIGS.

DETAILED DESCRIPTION

FIG. 1 shows a motor vehicle 1 that includes a system 5 for ending shoulder driving according to the improved approach.

On the left in FIG. 1, the motor vehicle 1 is located on a roadway 2 that for example is bordered by a shoulder 4 on a right side of the motor vehicle 1. The middle illustration in FIG. 1 shows the right wheels of the motor vehicle 1 on the shoulder, whereas the left wheels of the motor vehicle 1 remain on the roadway 2 so that shoulder driving exists. The image on the right in FIG. 1 shows the motor vehicle 1 on the bottom that is again driving entirely on the roadway 2 following a method for ending shoulder driving according to the approved approach. The top right illustration in FIG. 1 shows another motor vehicle 3 that is driving on the roadway in a direction opposite the driving direction of the motor vehicle 1. In the event of an excessively strong reaction by a driver of the motor vehicle 1 in particular without a method or a system being used according to the improved approach, it can happen that the motor vehicle 1 passes into the opposite lane and collides with the other motor vehicle 3 as indicated with a dashed line.

The system 5 for ending shoulder driving includes a detection unit 6, a sensor unit 7, a computing unit 8 and a control unit 9. Optionally, the system 5 may include a computer-readable storage medium 22 on which a computer program according to the improved approach can be saved, and that can be run by the computing unit 8 in order to perform a method according to the improved approach.

The operation of the system 5 will be explained below in greater detail with reference to FIG. 2.

Figure 2:
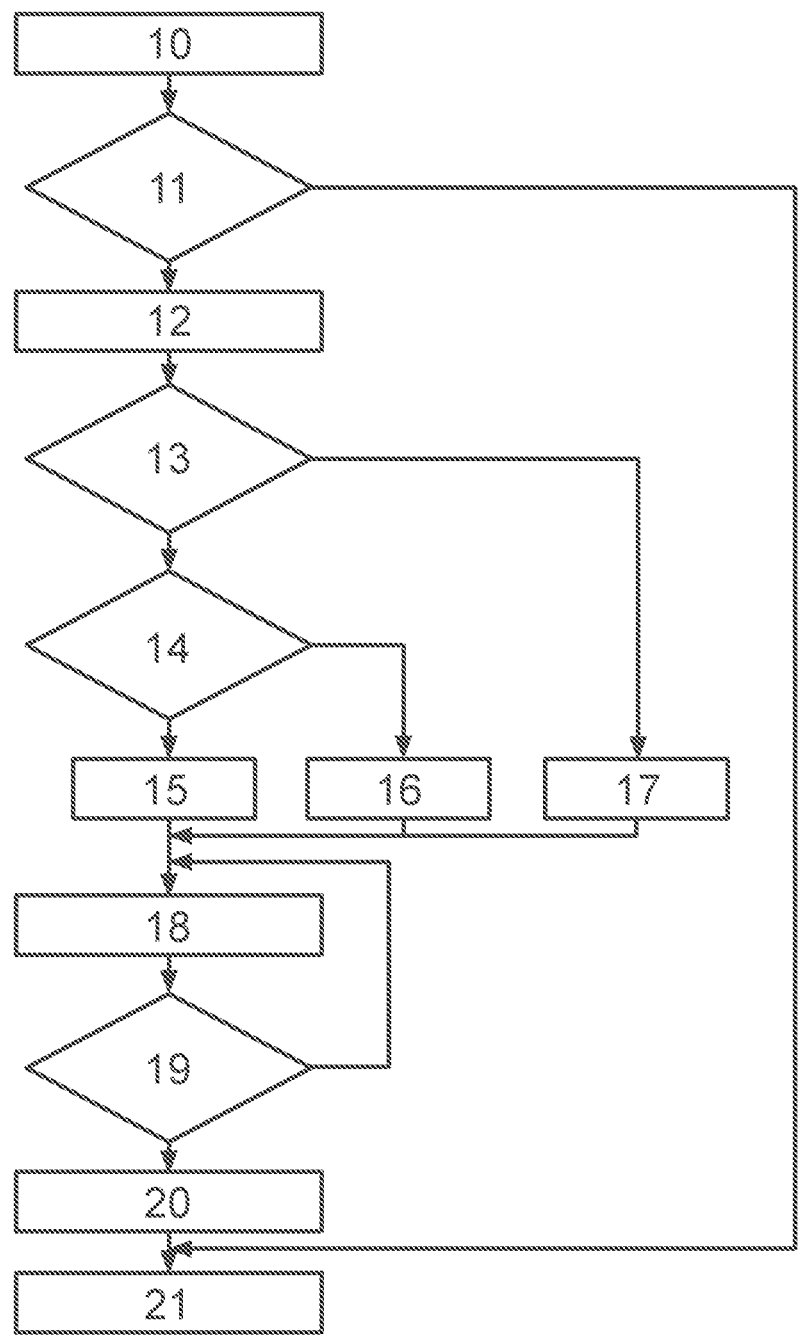
FIG. 2 shows a flowchart of an exemplary embodiment of a method according to the improved approach.

FIG. 2 shows a flowchart of an exemplary embodiment of a method for ending shoulder driving according to the improved approach that for example can be performed by a system 5 of a motor vehicle 1 as shown in FIG. 1.

If the motor vehicle 1 is driving with the left or the right wheels on the shoulder 4 as for example shown in the middle of FIG. 1, the system 5 may perform a multi-step method for supporting the driver in driving the motor vehicle 1 back from the shoulder 4, in particular to avoid a critical state of the motor vehicle.

In doing so, the system 5 may support the driver in particular when steering out of the shoulder 4 by intervening in the controlling of the motor vehicle 1. In doing so, the type of intervention depends in particular on the manner, in particular on the intensity, of a driver's reaction. If the driver overreacts, for example by a very strong steering intervention and/or braking intervention in conjunction with a strong steering intervention, the system 5 can stabilize the vehicle's behavior by an intervention that counteracts the driver's reaction. If there is no overreaction by the driver but rather for example a moderate steering or braking intervention in which an unstable vehicle reaction is not anticipated, then an intervention in the vehicle control can be undertaken by the system 5 that supports, i.e. reinforces the driver's reaction.

In step 10 of the method, it can for example be checked by the detection unit 6 if a wheel of the motor vehicle 1 is on the shoulder 4. In step 11, it is ascertained if the detection unit 6 has recognized the existence of shoulder driving. If this is not the case, the method continues with step 21, and normal driving of the motor vehicle 1 is continued without further action by the system 5.

If shoulder driving exists as shown in the middle of FIG. 1, a reaction by the driver, i.e., a driver's reaction, is ascertained by the sensor unit 7 in step 12 of the method. In step 13 of the method, it can for example be checked by the computing unit, in particular depending on one or more output signals from the sensor unit 7, if the driver has undertaken measures to steer the motor vehicle 1 off of the shoulder 4.

If this is the case, if the driver performs in particular a manual steering maneuver, it is checked in step 14 if an overreaction or an excessive intensity of the driver's reaction exists. If this is the case which for example can be recognized by a strong manual steering maneuver, or a strong braking maneuver in combination with a steering maneuver by the driver, the driver's reaction is assigned to a first intensity class. Correspondingly, a single wheel braking intervention is performed in step 15 of the method, for example automatically by the control unit 9, on at least one of the wheels located on the shoulder 4 to reduce the yaw behavior with respect to the steering maneuver of the driver. This reduces the lateral force potential of the tires on the shoulder from the braking force and therefore decreases a jump in lateral force. A jump in yaw torque, or respectively a jump in yaw acceleration upon reaching the paved roadway 2 is reduced. The motor vehicle 1 remains controllable however, and unstable driving behavior can be avoided. Alternatively or in addition, a steering intervention that steers toward the shoulder 4 can also be carried out automatically in step 15 by the control unit 9. To accomplish this, the control unit 9 can for example apply a steering torque or a steering angle on a steering system of the motor vehicle 1. If a steering movement perceptible to the driver, or a steering torque perceptible to the driver, is undesirable, a steer-by-wire steering system can alternatively be used that allows the wheels to be steered without moving the steering wheel. The benefit of this is that for example in the event of an ABS intervention during shoulder driving, the ABS intervention can be continued without further braking interventions by the system 5. Potential conflicts with the ABS system can therefore be avoided. The stabilization undertaken in step 15 is continued in step 18, for example until the motor vehicle 1 has left the shoulder 4. This is for example checked in step 19. Steps 18 and 19 can be performed iteratively. Once the motor vehicle 1 has left the shoulder 4, stabilization is ended in step 20, and normal driving is continued in step 21.

If it is established in step 14 that there is no overreaction by the driver, that i.e. in particular an appropriate steering and/or braking maneuver by the driver exists, the driver's reaction is assigned to the second intensity class. Correspondingly in step 16, for example a steering single wheel braking intervention is automatically performed by the control unit 9 on a wheel of the motor vehicle 1 located on the roadway 2 to support the driver's reaction. This increases the yaw behavior with respect to the steering maneuver of the driver which can support leaving the shoulder 4. In particular this counteracts a potential overreaction by the driver in advance that can occur due to the unexpectedly reduced yaw behavior as a consequence of the p-split situation. Alternatively or in addition, driving back from the shoulder 4 onto the roadway 2 can occur by a steering intervention in the direction of the roadway 2. In this case as well, steering torque or a steering angle can again be correspondingly applied to the steering system of the motor vehicle 1. Here as well, a steer-by-wire steering system can be used. The reinforcement undertaken in step 16 is continued in step 18 until the motor vehicle 1 has left the shoulder 4, which is iteratively checked in steps 18 and 19. If it is established in step 19, in particular by means of the detection unit 6, that the motor vehicle 1 has left the shoulder 4, the reinforcement is ended in step 20, and normal driving of the motor vehicle 1 is continued in step 21.

If it is established in step 13 that the driver has not initiated any measures to leave the shoulder 4, i.e., has in particular not performed a steering maneuver or has only performed a very weak steering maneuver, the driver's reaction is assigned to a third intensity class. Correspondingly, a warning signal is output to the driver in step 17, for example by means of the computing unit 8 or the control unit 9. The driver is thereby notified that he is driving on the shoulder 4. To warn the driver, for example an acoustic warning signal, an optical warning signal such as in the form of a light signal, or a text message, or a haptic warning signal for example in the form of a steering wheel vibration or a steering torque, can be used in order to give the driver corresponding feedback. A combination of such warning signals may also be used.

The warning may be multilevel depending on the driver's reaction. In this case, a different intensity of the warning signal or different warning signal types may be used in different levels of the warning. The warning is continued until the motor vehicle 1 has left the shoulder 4, which is established in step 19 by means of the detection unit 6. Once the motor vehicle 1 has left the shoulder 4, the warning is ended in step 20, and normal driving is continued in step 21.

In the event that the roadway is left, the described multilevel strategies for stabilizing, reinforcing and warning support the driver when driving back off the shoulder to continue normal driving. According to the improved approach, wheel-selective braking interventions may for example be arbitrated with braking interventions of other functions, for example other driver assistance systems. If the driver for example simultaneously brakes strongly upon leaving the shoulder, then for example all four wheels of the motor vehicle can be braked. In order to stabilize the motor vehicle or respectively reinforce it, it may be necessary in this situation to reduce a braking effect on the wheels on the inside or the outside of the curve. If during shoulder driving an emergency braking situation occurs and a collision is for example unavoidable, a braking intervention for the purpose of stabilizing or reinforcing in order to leave the shoulder can be omitted in order to not counteract the emergency braking.

A vehicle leaving the roadway onto the unpaved side area can be the reason for many serious accidents in road traffic. When attempting to drive the vehicle back onto the roadway, this critical driving situation can in particular be exacerbated by strong and/or fast interventions in steering and/or braking by the driver. If the vehicle namely enters the shoulder next to the roadway with the wheels of one side of the vehicle and the driver of the motor vehicle attempts to drive the vehicle back onto the roadway, then first the front wheel drives from the shoulder onto the roadway. This front wheel therefore experiences a jump in the friction value when transitioning from the shoulder to the paved roadway that leads to a jump in lateral force and therefore to a jump in the yaw torque. If the front and rear wheel experience the transition from the shoulder to the paved roadway, then a jump in transverse acceleration occurs. In both cases, the vehicle experiences high transverse acceleration. If the driver in this situation steers strongly and perhaps also brakes at the same time, then the front axle of the motor vehicle can be further stressed and the rear axle unstressed, which reinforces the effect of the jump in the yaw torque.

This driving behavior of the motor vehicle unexpected by the driver and the associated high sideslip angle may for example cause the vehicle to not be driven stably back onto the original lane as intended by the driver but rather to turn further than intended and be overcontrolled and enter the lane of overtaken vehicles or into the oncoming traffic, or drive into the roadside ditch on the opposite side. This loss of control can lead to serious accidents. By means of a method and a system for ending shoulder driving according to the improved approach, such accidents can be avoided as described.

LIST OF REFERENCE NUMERALS

1 Motor vehicle
2 Roadway
3 Motor vehicle
4 Shoulder
5 System
6 Detection unit
7 Sensor unit
8 Computing unit
9 Control unit
10 to 21 Method steps
22 Storage medium The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for reducing shoulder driving by a motor vehicle, comprising:
   recognizing, using a detection circuit of the motor vehicle, that a wheel of the motor vehicle is located on a shoulder;
   recording, using a sensor of the motor vehicle, a driver's reaction;
   assigning, using a computer of the motor vehicle, the driver's reaction to one of at least two intensity classes;
   conducting, using a control circuit of the motor vehicle, an intervention in controlling the vehicle that counteracts the driver's reaction when the driver's reaction has been assigned to a first intensity class of the at least two intensity classes; and
   conducting, using the control circuit, an intervention in controlling the vehicle that supports the driver's reaction if the driver's reaction has been assigned to a second intensity class of the at least two intensity classes.

2. The method of claim 1, further comprising:
   conducting no intervention by the control circuit in controlling the vehicle if the driver's reaction has been assigned to a third intensity class of the at least two intensity classes.

3. The method of claim 2, further comprising:
   outputting, by the control circuit, a warning signal if the driver's reaction has been assigned to the third intensity class.

4. The method of claim 1, wherein, if the driver's reaction has been assigned to the first intensity class, conducting, by the control circuit, a single wheel braking intervention for the wheel located on the shoulder as the intervention counteracting the driver's reaction.

5. The method of claim 1, wherein, if the driver's reaction has been assigned to the first intensity class, conducting, by the control circuit, a steering intervention in the direction toward the shoulder as the intervention counteracting the driver's reaction.

6. The method of claim 1, wherein, if the driver's reaction has been assigned to the second intensity class, conducting, by the control circuit, a single wheel braking intervention for another wheel of the motor vehicle that is not located on the shoulder as the intervention supporting the driver's reaction.

7. The method of claim 1, wherein, if the driver's reaction has been assigned to the second intensity class, conducting, by the control circuit, a steering intervention in the direction away from the shoulder as the intervention supporting the driver's reaction.

8. The method of claim 1, further comprising determining, by the computer, at least one intensity characteristic value of the driver's reaction;
   wherein the assignment of the driver's reaction to one of at least two intensity classes is performed depending on the at least one intensity characteristic value.

9. A system for reducing shoulder driving by a motor vehicle, wherein the system comprises:
   a detection circuit configured to recognize that a wheel of the motor vehicle is located on a shoulder;
   a sensor configured to record a driver's reaction;
   a computer configured to assign the driver's reaction to one of at least two intensity classes; and
   a control circuit configured
   to initiate an intervention in controlling the vehicle that counteracts the driver's reaction when the driver's reaction has been assigned to a first intensity class of the at least two intensity classes; and
   to initiate an intervention in controlling the vehicle that supports the driver's reaction if the driver's reaction has been assigned to a second intensity class of the at least two intensity classes.

10. A non-transitory computer-readable medium including instructions executed by a computer that cause a control circuit of a system for reducing shoulder driving by a motor vehicle to initiate an intervention in controlling the vehicle that counteracts a driver's reaction when the driver's reaction has been assigned to a first intensity class of the at least two intensity classes; and to initiate an intervention in controlling the vehicle that supports the driver's reaction if the driver's reaction has been assigned to a second intensity class of the at least two intensity classes.

11. The method of claim 2, wherein, if the driver's reaction has been assigned to the first intensity class, conducting, by the control circuit, a single wheel braking intervention for the wheel located on the shoulder as the intervention counteracting the driver's reaction.

12. The method of claim 3, wherein, if the driver's reaction has been assigned to the first intensity class, conducting, by the control circuit, a single wheel braking intervention for the wheel located on the shoulder as the intervention counteracting the driver's reaction.

13. The method of claim 2, wherein if the driver's reaction has been assigned to the first intensity class, conducting, by the control circuit, a steering intervention in the direction toward the shoulder as the intervention counteracting the driver's reaction.

14. The method of claim 3, wherein, if the driver's reaction has been assigned to the first intensity class, conducting, by the control circuit, a steering intervention in the direction toward the shoulder as the intervention counteracting the driver's reaction.

15. The method of claim 4, wherein, if the driver's reaction has been assigned to the first intensity class, conducting, by the control circuit, a steering intervention in the direction toward the shoulder as the intervention counteracting the driver's reaction.

16. The method of claim 2, wherein, if the driver's reaction has been assigned to the second intensity class, conducting, by the control circuit, a single wheel braking intervention for another wheel of the motor vehicle that is not located on the shoulder as the intervention supporting the driver's reaction.

17. The method of claim 3, wherein, if the driver's reaction has been assigned to the second intensity class, conducting, by the control circuit, a single wheel braking intervention for another wheel of the motor vehicle that is not located on the shoulder as the intervention supporting the driver's reaction.

18. The method of claim 4, wherein, if the driver's reaction has been assigned to the second intensity class, conducting, by the control circuit, a single wheel braking intervention for another wheel of the motor vehicle that is not located on the shoulder as the intervention supporting the driver's reaction.

19. The method of claim 5, wherein, if the driver's reaction has been assigned to the second intensity class, conducting, by the control circuit, a single wheel braking intervention for another wheel of the motor vehicle that is not located on the shoulder as the intervention supporting the driver's reaction.

20. A non-transitory computer-readable medium including instructions that cause a system for reducing shoulder driving by a motor vehicle to conduct the method of claim 1.

* * * * *